(12) United States Patent
Beehler et al.

(10) Patent No.: US 11,242,138 B2
(45) Date of Patent: Feb. 8, 2022

(54) ROTOR DRIVE KEY ASSEMBLY

(71) Applicant: Honeywell International Inc., Morris Plains, NJ (US)

(72) Inventors: Jonathan T. Beehler, Bremen, IN (US); Matthew Spray, Elkhart, IN (US); Betty J Franco, Granger, IN (US); David Flask, Granger, IN (US)

(73) Assignee: Honeywell International Inc., Charlotte, NC (US)

( * ) Notice: Subject to any disclaimer, the term of this patent is extended or adjusted under 35 U.S.C. 154(b) by 700 days.

(21) Appl. No.: 16/146,114

(22) Filed: Sep. 28, 2018

(65) Prior Publication Data

US 2020/0102069 A1 Apr. 2, 2020

(51) Int. Cl.
| | |
|---|---|
| *B64C 25/36* | (2006.01) |
| *B64C 25/44* | (2006.01) |
| *F16D 65/092* | (2006.01) |
| *F16D 65/00* | (2006.01) |
| *F16B 3/00* | (2006.01) |
| *F16B 5/02* | (2006.01) |
| *F16D 125/06* | (2012.01) |
| *F16D 65/02* | (2006.01) |
| *F16D 121/06* | (2012.01) |

(52) U.S. Cl.
CPC .............. *B64C 25/36* (2013.01); *B64C 25/44* (2013.01); *F16B 3/00* (2013.01); *F16B 5/02* (2013.01); *F16D 65/0006* (2013.01); *F16D 65/092* (2013.01); *F16D 2065/138* (2013.01); *F16D 2065/1368* (2013.01); *F16D 2121/06* (2013.01); *F16D 2125/06* (2013.01)

(58) Field of Classification Search
CPC ....... F16D 2065/138; F16D 2065/0006; F16D 2065/092; F16B 5/02; F16B 3/00; B64C 25/44; B64C 25/36
See application file for complete search history.

(56) References Cited

U.S. PATENT DOCUMENTS

| | | | | |
|---|---|---|---|---|
| 3,958,833 | A | * | 5/1976 | Stanton .................. F16D 55/40 301/6.2 |
| 5,024,297 | A | * | 6/1991 | Russell .................. F16D 55/36 188/18 A |
| 5,186,521 | A | | 2/1993 | Niespodziany et al. |
| 6,003,954 | A | | 12/1999 | Everhard et al. |
| 8,430,457 | B2 | | 4/2013 | Baldassara |

(Continued)

*Primary Examiner* — Scott A Browne (74) *Attorney, Agent, or Firm* — Shumaker & Sieffert, P.A.

(57) ABSTRACT

In some examples, an assembly includes a vehicle wheel that defines an interior and an exterior surface, where the interior surface defines a first protrusion and a second protrusion. The first protrusion defines a first aperture extending in a substantially axial direction. The assembly further includes a rotor drive key on the interior surface, the drive key defining a first and second feature, and the first feature defines a second aperture extending in the substantially axial direction and is configured to align with the first aperture. The assembly includes a fastener configured to be inserted through the first and second aperture in the substantially axial direction to attach the key to the interior surface of the wheel, where the second aperture is configured to form a threaded connection with an end of the fastener. When the fastener is tightened via the threaded connection, the second feature engages the second protrusion.

20 Claims, 6 Drawing Sheets

(56) References Cited

U.S. PATENT DOCUMENTS

| | | | |
|---|---|---|---|
| 9,919,794 B2* | 3/2018 | Rook | F16D 55/36 |
| 2006/0006729 A1* | 1/2006 | Rutten | F16D 65/123 |
| | | | 301/6.2 |
| 2007/0236076 A1 | 10/2007 | Tong et al. | |
| 2020/0102069 A1* | 4/2020 | Beehler | F16D 65/092 |
| 2021/0262526 A1* | 8/2021 | Fish | F16D 55/36 |

* cited by examiner

ROTOR DRIVE KEY ASSEMBLY

TECHNICAL FIELD

The present disclosure relates to wheel brake systems of a vehicle, and in particular, rotor drive key assemblies for wheel brake systems of a vehicle.

BACKGROUND

Vehicles, such as aircrafts, may use a wheel brake system that includes a multi-disc brake assembly. For example, the multi-disc brake assembly may include a plurality of rotors attached to a wheel and a plurality of stators interleaved with the rotors. The rotors and wheel are configured to rotate around an axle, while the stators remain stationary. To decelerate rotational motion of a rotating wheel, the brake assembly may displace pistons against a pressure plate to squeeze the rotating rotors attached to the wheel against the stationary stators, therefore producing torque that decelerates the rotational motion of the wheel. In some examples, the rotors may be attached to the wheel via rotor drive keys positioned on an interior surface of the wheel. In some such examples, the rotors may define slots configured to receive the rotor drive keys.

SUMMARY

The disclosure describes articles, systems, and techniques relating to rotor drive keys of a wheel brake system of a vehicle. The rotor drive keys described herein are configured to be attached to an interior surface of a wheel. The interior surface of the wheel defines a first protrusion and a second protrusion, and the first protrusion defines a first aperture that extends through the first protrusion in a substantially axial direction. The rotor drive key defines a first feature and a second feature, with the first feature defining a second aperture extending through the first feature in the substantially axial direction. When the rotor drive key is positioned on the interior surface of the wheel, the first aperture and the second aperture are configured to align and receive a fastener (e.g., a bolt or a screw) to attach the rotor drive key to the interior surface of the wheel. In this way, the fastener may be inserted through the first and second aperture in the substantially axial direction, which may result in the fastener being less likely to become loose during operation of the wheel or braking system (e.g., due to heat cycling, vibration, or other operating conditions). Moreover, the second feature of the rotor drive key is configured to engage the second protrusion of the wheel when the rotor drive key is attached to the wheel via the fastener. In turn, movement of the rotor drive key during operation of the wheel may be reduced or even prevented. In some examples, movement of the rotor drive key may also be reduced or prevented in cases in which the fastener is configured to attach the rotor drive key to the wheel is inoperative or missing.

In one example, an assembly includes a wheel of a vehicle. The wheel defines an interior surface and an exterior surface, where the interior surface defines a first protrusion and a second protrusion. The first protrusion defines a first aperture extending through the first protrusion in a substantially axial direction. The assembly further includes a rotor drive key on the interior surface of the wheel. The rotor drive key defines a first feature and a second feature, and the first feature defines a second aperture extending through the first feature in the substantially axial direction and is configured to align with the first aperture. The assembly also includes a fastener configured to be inserted through the first aperture and the second aperture in the substantially axial direction to attach the rotor drive key to the interior surface of the wheel, where the second aperture is configured to form a threaded connection with an end of the fastener. When the fastener is tightened via the threaded connection while inserted through the first aperture and second aperture, the second feature engages the second protrusion.

In another example, a rotor drive key includes a first feature and a second feature. The first feature defines an aperture extending through the first feature in a substantially axial direction, and the second feature is configured to mechanically engage with an interior surface of a wheel of a vehicle when the rotor drive key is attached to the interior surface of the vehicle.

In yet another example, a method includes placing a rotor drive key on an interior surface of a wheel of a vehicle. The interior surface of the wheel defines a first protrusion and a second protrusion, and the first protrusion defines a first aperture extending through the first protrusion in a substantially axial direction. The rotor drive key defines a first feature and a second feature, and the first feature defines a second aperture extending through the first feature in the substantially axial direction, where the second aperture is configured to align with the first aperture. The method further includes inserting a fastener through the first aperture and the second aperture in the substantially axial direction to attach the rotor drive key to the wheel and forming a threaded connection between the second aperture and the fastener. When the fastener is tightened via the threaded connection while inserted through the first aperture and second aperture, the second feature engages the second protrusion.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure describes articles, systems, and techniques relating to rotor drive keys of a wheel brake system of a vehicle. The rotor drive keys described herein are configured to be attached to an interior surface of a wheel. The interior surface of the wheel defines a first protrusion and a second protrusion, and the rotor drive key defines a first feature and a second feature. Both the first protrusion of the interior surface of the wheel and the first feature of the rotor drive key define an aperture that extends through the first protrusion and first feature, respectively, in a substantially axial direction. The apertures of the first protrusion and the first feature are configured to align when the rotor drive key is on the interior surface of the wheel. A fastener (e.g., a bolt or screw) may be inserted in the substantially axial direction through the aligned apertures to attach the rotor drive key to the wheel. In addition, the second feature of the rotor drive key engages the second protrusion of the interior surface of the wheel. For ease of description, examples of the disclosure are described herein primarily as including a fastener in the form of a bolt or a screw. However, any suitable fastener configured to form a threaded connection in the manner described herein may be employed, which may or may not take the form of a bolt or a screw.

Some rotor drive keys are attached to an interior surface a wheel using a bolt inserted through an aperture defined by the rotor drive key in along an axis that is substantially transverse to the axial direction. For example, a bolt may be configured to be inserted through a first aperture defined by a rotor drive key and a second aperture defined by a rim of a wheel. In some such examples, the bolt may be secured in place via a threaded connection with a nut (e.g., a nut positioned on an exterior surface of the rim of the wheel and aligned with the aperture defined by the wheel). Thus, in some such examples, the bolt may be oriented along the axis that is substantially transverse to the axial direction or oriented in a radial direction. Additionally, or alternatively, in some cases, a rotor drive key may be attached to a wheel using a screw with a countersunk head arranged perpendicular to a length of the rotor drive key and axle centerline and installed flush to a surface of the rotor drive key. For instance, the screw may be installed into a threaded hole in a boss or into a boss containing a barrel nut, which may be nearest an end of a tubewell opposite a spoke in some examples. As another example, a rotor drive key may be attached to a wheel via a key post extending into a socket on the wheel at one end of the rotor drive key and secured in place by a bolted joint at the other end of the rotor drive key.

Some such rotor drive keys may be more likely to become unattached to the interior surface of the wheel. For instance, heat cycling, vibration, or the like may result in the nut and/or bolt becoming loose or even completely unattached to the rotor drive key and wheel assembly. In turn, the rotor drive key may not be secured to the wheel, which may decrease the useful life of the rotor drive key and/or wheel, interrupt the function of the braking assembly for the wheel, increase maintenance costs, result in premature replacement of the rotor drive key, or the like. In addition, some other rotor drive keys may not include a first or a second feature, the interior surface of the wheel may not include a first or a second protrusion, or both. Thus, in some such examples, the rotor drive keys may be subject to increased movement (e.g., axial or radial), as the assembly does not include features and/or protrusions configured to engage in the substantially axial direction. Moreover, in examples in which the bolt loosens or disengages, the rotor drive keys of such assemblies may not include any other mechanism or point of engagement configured to help maintain the rotor drive key in an intended position on the interior surface of the wheel.

The rotor drive keys described herein may be attached to the interior surface of the wheel using a bolt or a screw that is substantially aligned with an axial direction of the wheel, which may result in the bolt or the screw being less likely to loosen during operation of the wheel or braking system (e.g., due to heat cycling, vibration, or other operating conditions) in comparison to other rotor drive key assemblies. Moreover, the second feature of the rotor drive key described herein is configured to engage the second protrusion of the interior surface of the wheel when the rotor drive key is attached to the wheel. In turn, movement of the rotor drive key during operation of the wheel may be reduced or even prevented. For example, the engagement between the second protrusion and second feature may be a mechanical engagement, such as an interference fit, which may help maintain the rotor drive key in an intended position on the interior surface of the wheel, even if a bolt or a screw is not present (e.g., not used, unattached, disengaged, malfunctioning, or the like).

Figure 1:
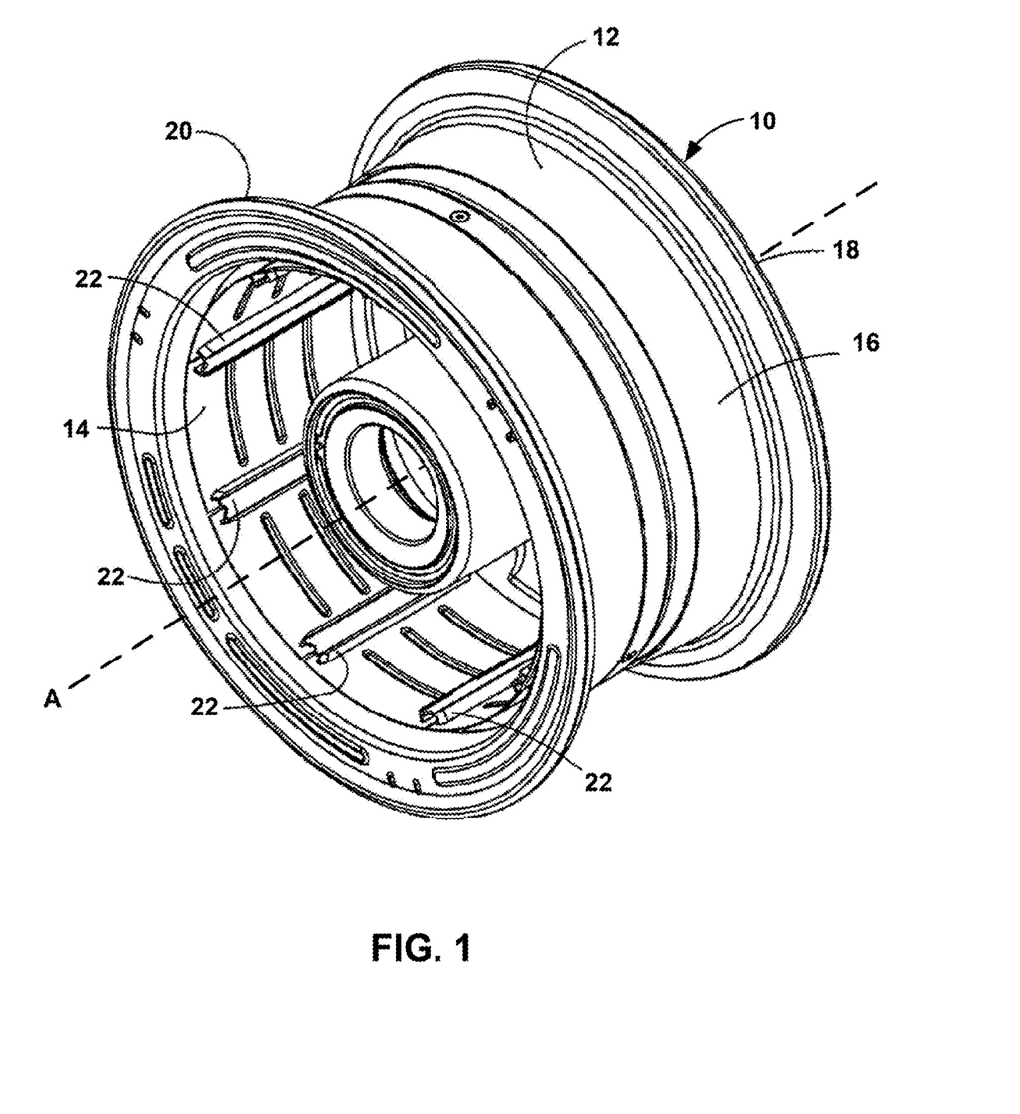
FIG. 1 is a perspective view illustrating an example wheel including a plurality of rotor drive keys on an interior surface of the wheel.

FIG. 1 is a perspective view illustrating an example wheel 10 including a plurality of rotor drive keys 22 on an interior surface 14 of wheel 10. In some examples, wheel 10 is a part of an aircraft vehicle. In other examples, wheel 10 may be a part of any other vehicle, such as, for example, any marine vessel, land vehicle, or other vehicle.

Wheel 10 may include a rim 16 defining an exterior surface 12 and an interior surface 14. In some examples, interior surface 14 may include an inner diameter of a tubewell of wheel 10. For example, in some cases, interior surface 14 may be referred to as an inner diameter surface of wheel 10.

In some examples, a tire (not shown) may be mounted on exterior surface 12 of rim 16. For example, wheel 10 may include an inboard flange 20 and an outboard flange 18 for retaining a tire on exterior surface 12 of rim 16. Wheel 10 may be configured to engage with a plurality of rotors (not shown in FIG. 1) of a braking assembly. For example, as shown in the example of FIG. 1, a plurality of rotor drive keys 22 are attached to interior surface 14, and each rotor drive key of the plurality of rotor drive keys 22 may be configured to engage with one or more rotors of a braking assembly. An example braking assembly will be described in more detail with respect to FIG. 2.

In some examples, each rotor drive key of the plurality of rotor drive keys 22 extends in a substantially axial direction of wheel 10 (e.g., in the direction of the axis label "A" in FIG. 1). For example, a length of each rotor drive key of the plurality of rotor drive keys 22 may extend in the substantially axial direction. In some such examples, the respective length of each rotor drive key may extend from (or near) a first edge of wheel 10 to (or close to) a second edge of wheel 10. In this way, a length of a rotor drive key of the plurality of rotor drive keys 22 may be the same or substantially similar to a width of wheel 10 from the first edge to the second edge. The plurality of rotor drive keys 22 extending in the substantially axial direction may enable wheel 10 to slide onto a braking assembly. For example, a plurality of rotors of a braking assembly may include slots configured to receive the plurality of rotor drive keys 22 enabling the plurality of rotor drive keys 22 to be slid into respective slots of the plurality of rotors. In other examples, one or more rotor drive keys of the plurality of rotor drive keys 22 may be oriented in a different direction and/or may engage with one or more rotors in a different manner.

The plurality of rotor drive keys 22 may include any suitable number of rotor drive keys. The number of drive keys may be vehicle specific and may depend on, e.g., loads, size of parts, material property, and the like. In some examples, the number of the rotor drive keys included in the plurality of rotor drive keys 22 may correspond to a number of slots defined by a plurality of rotors of a braking assembly configured to receive the plurality of rotor drive keys 22. For example, each rotor drive key of the plurality of rotor drive keys 22 may correspond to a respective slot defined by the plurality of rotors of a braking assembly.

As illustrated in the example of FIG. 1, the plurality of rotor drive keys 22 are mounted at substantially equal circumferential distances around interior surface 14 of wheel 10. In other examples, one or more of the plurality of rotor drive keys 22 may be mounted a different distance from an adjacent rotor drive than at least one other rotor drive key. More details with respect to the rotor drive keys of the plurality of rotor drive keys 22 and interior surface 14 of wheel 10 will be described with respect to FIGS. 3-4C.

As described in further detail below with regard to FIGS. 3-4C, the plurality of rotor drive keys 22 may each include a first feature and a second feature. The first feature may define an aperture extending through the first feature in a substantially axial direction, and the second feature may be configured to mechanically engage with interior surface 14 of wheel 10 of a vehicle when the respective rotor drive key of the plurality of rotor drive keys 22 is attached to interior surface 14 of the vehicle.

Figure 2:
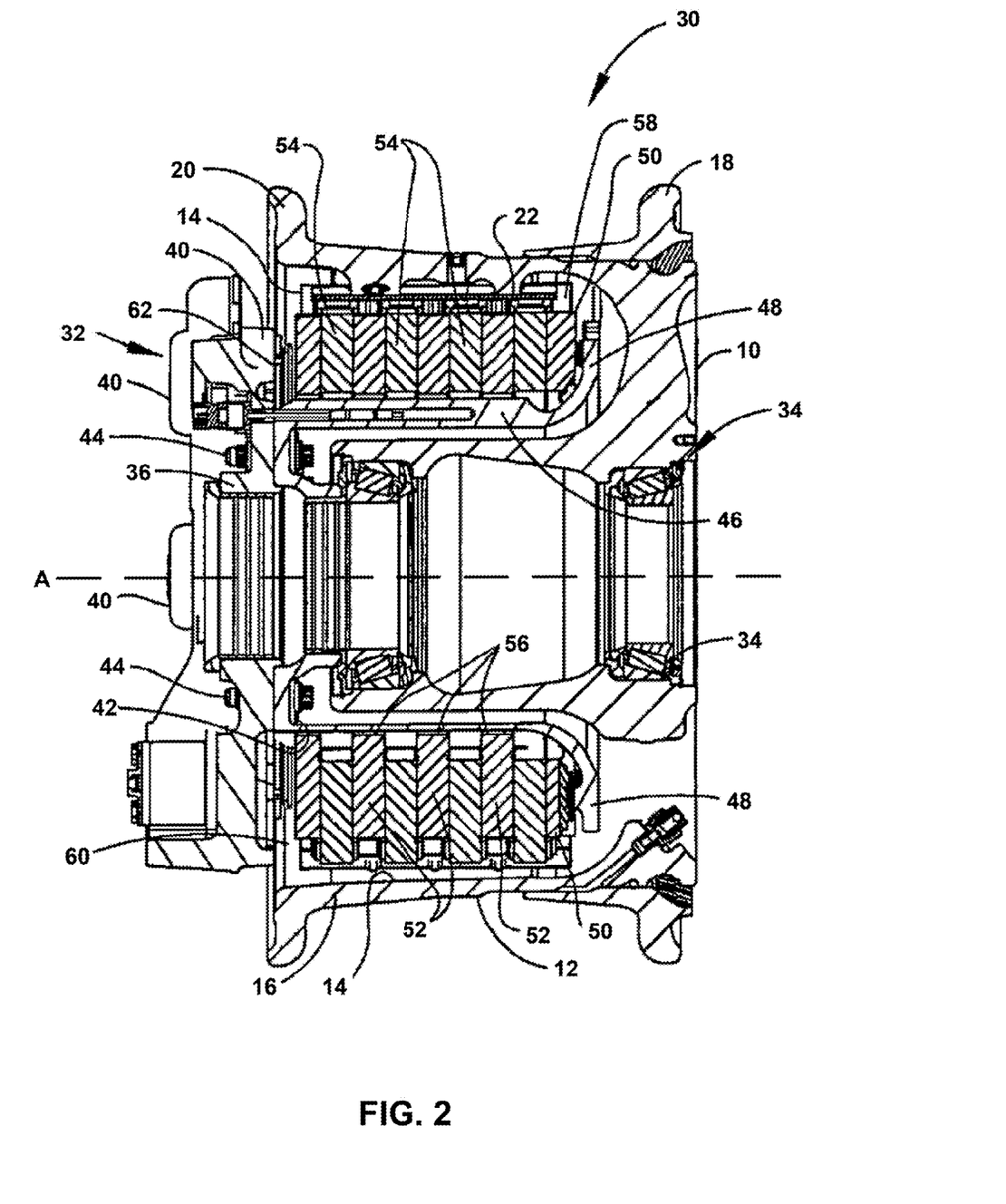
FIG. 2 is a schematic cross-sectional view illustrating an example wheel and brake assembly including the wheel of FIG. 1.

FIG. 2 is a schematic cross-sectional view illustrating an example wheel and brake assembly 30 including wheel 10 of FIG. 1 and a braking assembly 32. Wheel 10 may be configured to be rotatably carried on a fixed axle (not shown) by bearings 34. In turn, wheel 10 may impart motion to a vehicle including or mounted on the wheel and brake assembly 30.

In some examples, braking assembly 32 includes a plurality of stators 52 that are interleaved with a plurality of rotors 54. The plurality of stators 52 may include any suitable number of stators. In some cases, the plurality of stators 52 may be made of metal, a metal alloy, or a carbon-composite material. The plurality of stators 52 may have a plurality of circumferentially spaced-apart slots 56 configured to receive splines 46 of a torque tube 42. The plurality of stators 52 may be configured to remain stationary relative to wheel 10 when wheel 10 rotates.

Similar to the plurality of stators 52, the plurality of rotors 54 may include any suitable number of rotors, and may be made of metal, a metal alloy, or a carbon-composite material. In some examples, the plurality of rotors 54 may define a plurality of slots (not shown) configured to receive the plurality of rotor drive keys 22 to engage wheel 10. The engagement of the plurality of rotor drive keys 22 and the slots defined by the plurality of rotors 54 enable the plurality of rotors 54 to rotate with wheel 10.

In some examples, such as in examples in which the plurality of rotor drive keys 22 are mounted at substantially equal circumferential distances around interior surface 14 of wheel 10, the slots defined by the plurality of rotors 54 may be circumferentially spaced-apart at equal circumferential distances to correspond to the respective mounting locations of the plurality of rotor drive keys 22 on interior surface 14 of wheel 10. In other examples, the slots defined by the plurality of rotors 54 may be defined at any suitable circumferential positions of the plurality of rotors 54. In some examples, one end of each rotor drive key of the plurality of rotor drive keys 22 may be positioned in a mating recess 58 of wheel 10.

The plurality of rotors 54 may be configured to be able to slide along the plurality of rotor drive keys 22 such that the plurality of rotors 54 can be compressed with the plurality of stators 52 during braking of wheel 10. For example, the interleaved plurality of stators 52 and plurality of rotors 54 may be configured to be compressed between a movable pressure plate 60 and a backing plate 50. In turn, the engagement between pressure plate 60, the plurality of rotors 54, the plurality of stators 52, and backing plate 50 may decelerate rotational motion of wheel 10.

Brake assembly 32 may also include a rotatably fixed piston housing 36. In some examples, such as examples in which brake assembly 32 is associated with an aircraft vehicle, brake assembly 32 may be secured to a landing gear strut (not shown). Piston housing 36 may include a plurality of circumferentially spaced apart piston chambers 40. Each piston chamber 40 may include a piston of a plurality of pistons 62. In some examples, each piston of the plurality of pistons 62 may be slidably carried in the respective piston chamber 40. Piston chambers 40 may be supplied with pressurized hydraulic fluid via piston housing 36 communicating with an operator controlled fluid pressure source (not shown) to actuate the plurality of pistons 62.

In some examples, actuating the plurality of pistons 62 further actuates pressure plate 60. For instance, pressure plate 60 may be displaced away from piston chambers 40 by the plurality of pistons 62, resulting in pressure plate 60 and the plurality of stators 52 sliding axially along splines 46 of torque tube 42. In turn, pressure plate 60 and the plurality of stators 52 may engage the plurality of rotors 54. Such engagement may cause the plurality of rotors 54 to slide axially along the plurality of rotor drive keys 22, resulting in the plurality of rotors 54 and the plurality of stators 52 being squeezed between pressure plate 60 and backing plate 50. In this way, because the plurality of rotors 54 are fixed to wheel 10 via the plurality of rotor drive keys 22 and the plurality of stators 52 do not rotate with wheel 10, the rotational motion of wheel 10 may be decelerated.

Figure 3:
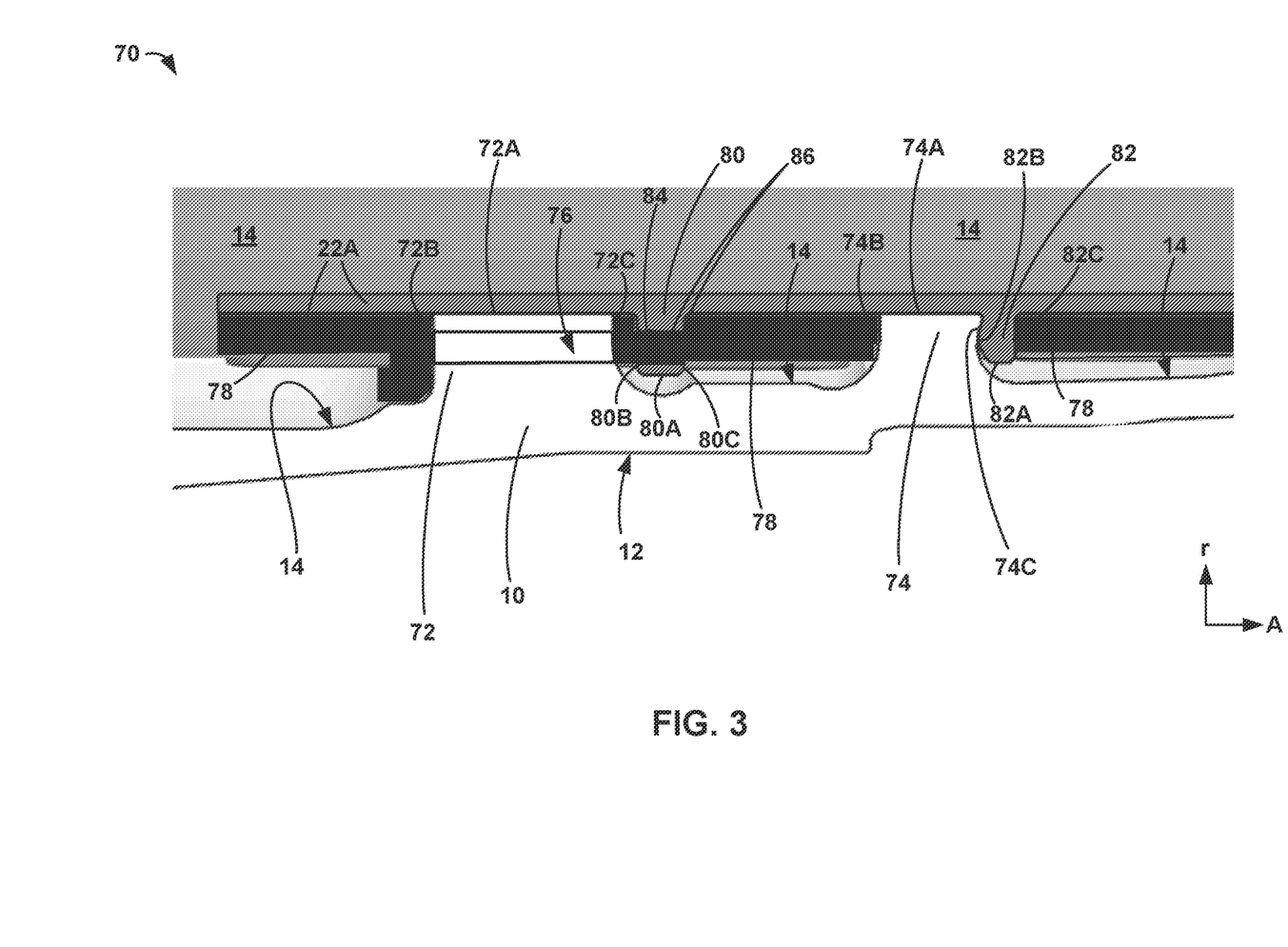
FIG. 3 is an enlarged cross-sectional view illustrating an example assembly including a rotor drive key on an interior surface of a wheel.

FIG. 3 is an enlarged cross-sectional view illustrating an example assembly 70 including a rotor drive key 22A on interior surface 14 of wheel 10. Assembly 70 may be a portion of wheel 10 including the plurality of rotor drive keys 22 of FIG. 1. For example, rotor drive key 22A may be an example of one of the rotor drive keys of the plurality of rotor drive keys 22. In some examples, each rotor drive key of the plurality of rotor drive keys 22 may be configured like rotor drive key 22A. Thus, the description of the following figures describes a particular rotor drive key 22A and a particular portion of wheel 10, but it should be understood that this description may apply to the other rotor drive keys of the plurality of rotor drive keys 22 and/or other portions of wheel 10 including the plurality of rotor drive keys 22.

Interior surface 14 of wheel 10 may define one or more protrusions. In some examples, wheel 10 may define one or more protrusions on a portion of interior surface 14 configured to be attached to a rotor drive key 22A of the plurality of rotor drive keys 22. For example, the portion of wheel 10 illustrated in FIG. 3 defines a first protrusion 72 and a second protrusion 74 on a portion of interior surface 14 configured to be attached to rotor drive key 22A. In this way, interior surface 14 may include a set of protrusions for each rotor drive key of the plurality of rotor drive keys 22 on interior surface 14. For example, each set of protrusions for each rotor drive key may include at least two protrusions, such as a set of protrusions including first protrusion 72 and second protrusion 74 for rotor drive key 22A. In other examples, interior surface 14 of wheel may define one or more than two protrusions (e.g., three, four, or more than four protrusions).

Protrusions 72, 74 may extend in a substantially radial direction from adjacent portions of interior surface 14 (e.g., in the direction of the r axis illustrated in FIG. 3, where the radial axis r and the axial axis A are illustrated for ease of description only). In this way, protrusions 72, 74 may extend more radially inward than respective portions of interior surface 14 adjacent to protrusions 72, 74. In some examples, protrusions 72, 74 may have any suitable height in the substantially radial direction (e.g., as measured from a portion of interior surface 14 adjacent to the respective protrusion 72, 74 to a top surface 72A, 74A of protrusion 72, 74, respectively). Moreover, protrusions 72, 74 may have the same height or substantially the same height, or may have different heights.

In some examples, first protrusion 72 may have any suitable width (e.g., as measured from a first side surface 72B to a second side surface 72C of protrusion 72 in the substantially axial direction). Similarly, second protrusion 74 may any suitable width (e.g., as measured from a third side surface 74B to a fourth side surface 74C of protrusion 74 in the substantially axial direction). In some examples, as illustrated in FIG. 3, first protrusion 72 and second protrusion 74 may have different widths. In other examples, first protrusion 72 and second protrusion 74 may have the same or substantially the same width.

In some examples, interior surface 14 includes at least two protrusions. In the example of FIG. 3, interior surface 14 includes two protrusions. In other examples, however, interior surface 14 may include any suitable number of protrusions, such as, for example, three protrusions or four or more protrusions. The protrusions may be any suitable distance from each other along interior surface 14 of wheel 10. For example, second side surface 72C of first protrusion 72 may be any suitable distance from third side surface 74B of second protrusion 74.

In some examples, first protrusion 72 defines a first aperture 76 extending through first protrusion 72 in a substantially axial direction (in the direction of the axial axis A illustrated in FIG. 3). In some examples, first aperture 76 is configured to receive a fastener to secure rotor drive key 22A to wheel 10. For example, a bolt or a screw (not shown in FIG. 3) may be inserted through first aperture 76 in the substantially axial direction to secure rotor drive key 22A to wheel 10. An example assembly including rotor drive key 22A attached to wheel 10 using a bolt will be described in more detail with respect to FIGS. 4A-4C.

Rotor drive key 22A may be positioned on interior surface 14 of wheel 10. In some examples, an inner surface 78 of rotor drive key 22A may contact top surfaces 72A, 74A of first and second protrusions 72, 74, respectively. Thus, in some such examples, such as examples in which inner surface 78 of rotor drive key 22A is relatively planar, top surfaces 72A, 74A may also be relatively planar so that top surfaces 72A, 74A substantially contact inner surface 78. In other examples, inner surface 78, top surface 72A, and/or top surface 74A may not be relatively planar and/or inner surface 78 may not contact one or both of top surface 72A or top surface 74A.

Rotor drive key 22A may define one or more features. For example, rotor drive key 22A shown in FIG. 3 defines a first feature 80 and a second feature 82. First and second features 80, 82 of rotor drive key 22A may be configured to oppose first and second protrusions 72, 74, respectively, of wheel 10. For example, features 80, 82 may extend in a substantially radial direction from inner surface 78 (e.g., in the direction of the radial axis r illustrated in FIG. 3), and when rotor drive key 22A is on interior surface 14 of wheel 10 as illustrated in FIG. 3, features 80, 82 may extend in the opposite direction that protrusions 72, 74 extend. For instance, as described above, protrusions 72, 74 may extend radially inward. Thus, features 80, 82 may extend radially outward (when rotor drive key 22A is on interior surface 14 of wheel 10). As another example, one or both of features 80, 82 may include an indentation defined by rotor drive key 22A configured to oppose first and second protrusions 72, 74. For example, second feature 82 may include an indentation configured to engage with second protrusion 74 in the substantially axial direction. In yet another example, feature 80 and/82 may include another structure (e.g., other than a protrusion or an indentation) configured to oppose and/or engage protrusions 72, 74 of wheel 10.

In some examples, such as examples in which first feature 80 includes a protrusion, first feature 80 may have any suitable height in the substantially radial direction (e.g., as measured from inner surface 78 to a bottom surface 80A of feature 80). In addition, second feature 82 (e.g., including a protrusion) may also have any suitable height in the substantially radial direction (e.g., as measured from inner surface 78 to a bottom surface 82A of feature 82). Moreover, features 80, 82 may have the same height or substantially the same height, or may have different heights. In yet other examples, first and/or second feature 80, 82 may not include a protrusion (e.g., first and/or second feature 80, 82 may include an indentation or another structure configured to oppose and/or engage protrusions 72, 74 of wheel 10).

In some examples, first feature 80 may have any suitable width (e.g., as measured from a fifth side surface 80B to a sixth side surface 80C of feature 80 in the substantially axial direction). Second feature 82 may also have any suitable width (e.g., as measured from a seventh side surface 82B to an eighth side surface 82C of feature 82 in the substantially axial direction). In some examples, first feature 80 and second feature 82 may have different widths. In other examples, first feature 80 and second feature 82 may have the same or substantially the same width.

In some examples, rotor drive key 22A defines at least two features. In the example of FIG. 3, rotor drive key 22A defines two features. In other examples, however, rotor drive key 22A may define any suitable number of features, such as, for example, 3 features or 4 or more features. The at least two features may be any suitable distance from each other along inner surface 78 of rotor drive key 22A. For example, sixth side surface 80C of first feature 80 may be any suitable distance from seventh side surface 82B of second feature 82. In examples in which rotor drive key 22A defines more than two features, the features may similarly be any suitable distance from each other on inner surface 78 of rotor drive key 22A.

In some examples, first feature 80 defines a second aperture 84 extending through first feature 80 in a substantially axial direction (in the direction of the axial axis A illustrated in FIG. 3). In some examples, second aperture 84 is configured to receive a fastener to secure rotor drive key 22A to wheel 10. For example, a bolt or a screw may be inserted through second aperture 84 in the substantially axial direction to secure rotor drive key 22A to wheel 10. In some such examples, second aperture 84 may include first set of threads 86, which may be configured to form a threaded connection with a bolt or screw inserted into second aperture 84. In this way, an assembly 70 including rotor drive key 22A may be easier or require fewer parts to manufacture and/or assemble than some other assemblies including different rotor drive keys. For example, a bolt or a screw may be able to form a threaded connection directly with first set of threads 86 of second aperture 84, without the use of a nut or another component, as may be required to secure a bolt or a screw to some other rotor drive keys. First set of threads 86 defined by second aperture 84 may include male or female threads.

Protrusions 72, 74 may be configured to engage with rotor drive key 22A, receive a fastener configured to secure rotor drive key 22A to wheel 10, or both. For instance, in the example of FIG. 3, first protrusion 72 is configured to receive a bolt or a screw to secure rotor drive key 22A to interior surface 14 of wheel 10, and second protrusion 74 is configured to engage with rotor drive key 22A. Similarly, features 80, 82 defined by rotor drive key 22A may be configured to engage with first and/or second protrusions 72, 74, receive a fastener configured to secure rotor drive key 22A to wheel 10, or both. In some cases, each feature 80, 82 may correspond to a protrusion 72, 74 of wheel 10. For instance, first feature 80 may correspond to first protrusion 72 and second feature 82 may correspond to second protrusion 74. In some such examples, features 80, 82 and protrusions 72, 74 may align, mechanically engage, be adjacent to, be secured together, or the like.

In some examples, second protrusion 74 may be configured to engage (e.g., contact or mate with) with rotor drive key 22A. For example, second protrusion 74 may be configured to mechanically engage with second feature 82 via an interference or friction fit. In some examples, second protrusion 74 and second feature 82 may mechanically engage in the substantially axial direction. In some cases, mechanical engagement between second protrusion 74 and second feature 82 may help keep rotor drive key 22A attached to wheel 10, maintain the radial position of rotor drive key 22A on wheel, improve the robustness of the attachment of rotor drive key 22A, reduce motion of rotor drive key 22A relative to wheel 10 during dynamic braking conditions and/or brake vibration events, or the like. Moreover, mechanical engagement between second protrusion 74 and second feature in the substantially axial direction may help rotor drive key 22A remain in the intended position on interior surface 14 of wheel 10 in the case in which a fastener (e.g., a bolt or a screw) included in assembly 70, becomes loose, unattached, or otherwise fails. In this way, rotor drive key 22A may still function as intended, even without a fastener, or if the fastener malfunctions. Thus, first and/or second features 80, 82 may impede radial movement of rotor drive key 22A at an end of rotor drive key 22A nearest the spoke (e.g., an end of rotor drive key 22A opposite an end configured to receive the fastener). In some examples, engagement of second feature 82 and second protrusion 74 may enable rotor drive key 22A to remain contained on wheel 10 in the event a retention bolt or screw (or another fastener) is lost during operation of wheel 10. For instance, by having protrusions, such as features 80 and/or 82, of rotor drive key 22A that interface with bosses, such as protrusions 72 and/or 74, on a tubewell of wheel 10, rotor drive key 22A may be prevented from migrating out of wheel 10 in a direction parallel to the axle centerline of wheel 10.

In some cases, a shape of second feature 82 may correspond to a shape of second protrusion 74. As one example, fourth side surface 74C of second protrusion 74 may define a concave surface and seventh side surface 82B of second feature 82 may define a convex surface that corresponds to the concave surface of second protrusion 74. In other words, the concave surface of second protrusion 74 and the convex surface of second feature 82 may correspond such that the convex surface can fit into or otherwise mate with the concave surface to form a mechanical engagement (e.g., an interference fit). In some examples, corresponding shapes of second protrusion 74 and second feature 82 may further help keep rotor drive key 22A attached to wheel 10, maintain the radial position of rotor drive key 22A on wheel 10, improve the robustness of the attachment of rotor drive key 22A, reduce motion of rotor drive key 22A relative to wheel 10 during dynamic braking conditions and/or brake vibration events, or the like better than a second protrusion and a second feature that do not have corresponding shapes. However, a rotor drive key 22A including second feature 82 configured to mechanically engage with second protrusion 74 of wheel 10 in the substantially axial direction, even if second feature 82 and second protrusion 74 do not correspond in shape, may still enable assembly 70 to have improved attachment and retention of rotor drive key 22A in comparison to other rotor drive keys not including second feature 82 configured to mechanically engage with second protrusion 74. Although concave and convex surfaces are specifically described herein as corresponding shapes, it should be recognized that second protrusion 74 and second feature 82 could include any suitable corresponding or non-corresponding shapes. For example, second protrusion 74 and second feature 82 may include dovetail shapes, "L" shaped overhang shapes, or any other suitable shapes.

In the example of FIG. 3, first aperture 76 of first protrusion 72 is configured to align with second aperture 84 of first feature 80 when rotor drive key 22A is positioned on interior surface 14 of wheel 10. In this way, a fastener, such as a bolt or a screw, can be inserted through both first aperture 76 and second aperture 84 in the substantially axial direction to attach rotor drive key 22A to wheel 10. In addition, the alignment of first aperture 76 and second aperture 84 also enables a bolt, a screw, or another fastener to be inserted through first and second apertures 76, 84 and form a threaded connection with first set of threads 86 of second aperture 84.

In some examples, as illustrated in FIG. 3, second side surface 72C of first protrusion 72 and fifth side surface 80B of first feature 80 are not configured to contact. In other examples, second side surface 72C of first protrusion 72 and fifth side surface 80B of first feature 80 may be configured to contact upon tightening of a bolt or a screw inserted through first and second apertures 76, 84. In some such examples, first protrusion 72 and first feature 80 may also be configured to mechanically engage in the substantially axial direction, which may further help rotor drive key 22A remain in an intended position on wheel 10. In examples in which first protrusion 72 and first feature 80 are configured to engage, first protrusion 72 and first feature 80 may define corresponding shapes (e.g., shapes that mechanically engage via an interference fit in the substantially axial direction) similar to second protrusion 74 and second feature 82. In yet other examples, second side surface 72C of first protrusion 72 and fifth side surface 80B of first feature 80 may be configured to contact regardless of whether a bolt or a screw is inserted and/or tightened through first and second apertures 76, 84.

As described above, in some examples, rotor drive key 22A may be secured to wheel 10 via a fastener. In some examples, the fastener may include a bolt or a screw. In other examples, the fastener may include an additional or alternative attachment mechanism. For instance, in some cases, rotor drive key 22A may be secured to wheel 10 using both a bolt and nut. Thus, although the following description primarily refers to attachment of rotor drive key 22A to wheel 10 via a bolt alone, in other examples, rotor drive key 22A may be attached to wheel 10 in a different manner.

In addition, although the following description primarily refers to a bolt, it should be understood that a screw or other fastener could be used in place of the bolt. As used herein, a "screw" may refer to a threaded fastener or attachment mechanism that may be self-tapping (e.g., can form a hole in an object, although does not necessarily have to form a hole to be used). In this way, screws may have a pointed end. As used herein, a "bolt" may refer to a threaded fastener or attachment mechanism that is not self-tapping. Thus, in some examples, a bolt may have a relatively flat end. In other examples, however, a bolt may not have a relatively flat end. Additionally, a screw may be able to form threads with which a threaded connection is made, whereas a bolt may form a threaded connection with premade threads.

Figure 4A:
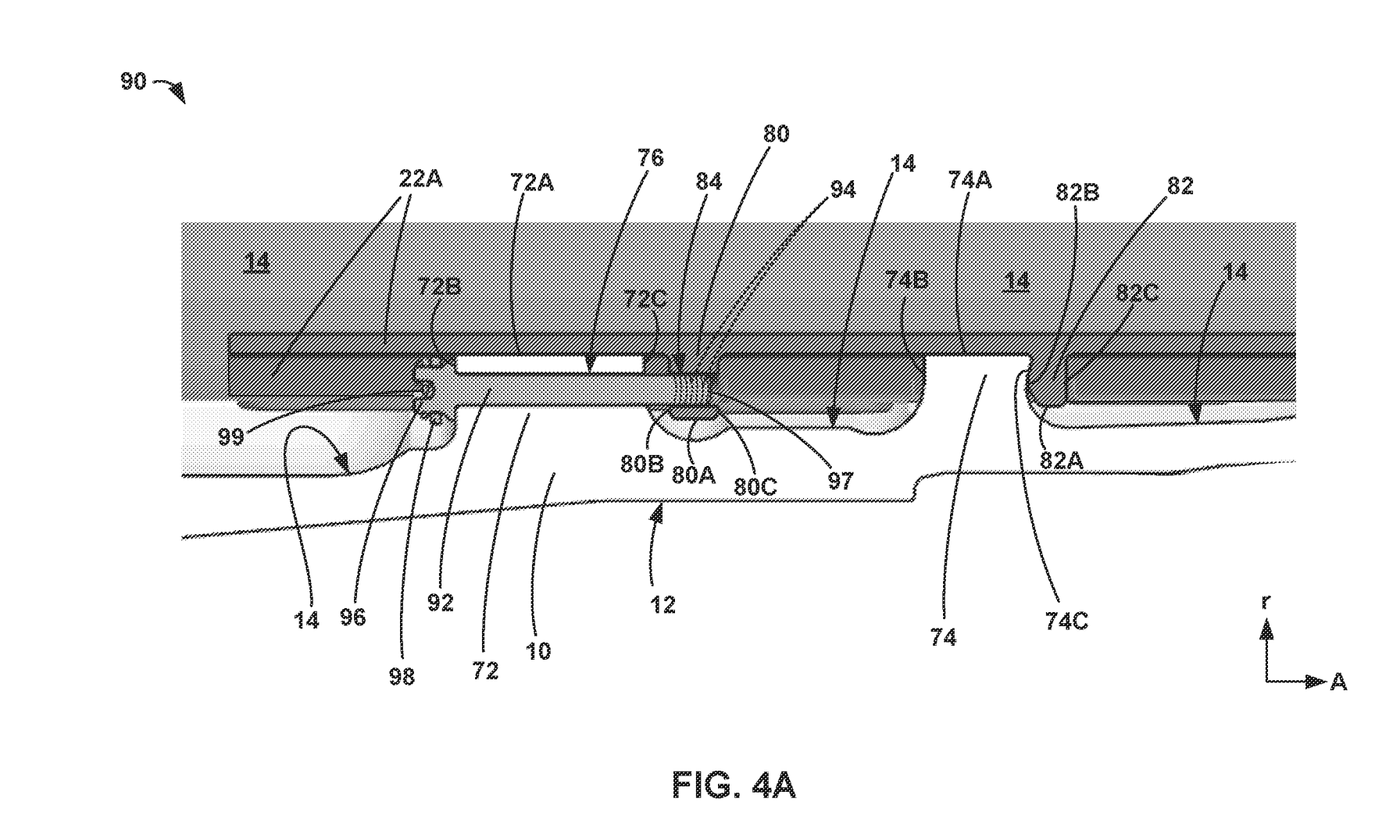
FIG. 4A is an enlarged cross-sectional view illustrating an example assembly including the rotor drive key attached to the interior surface of the wheel via a bolt and a bolt locking mechanism.
Figure 4B:
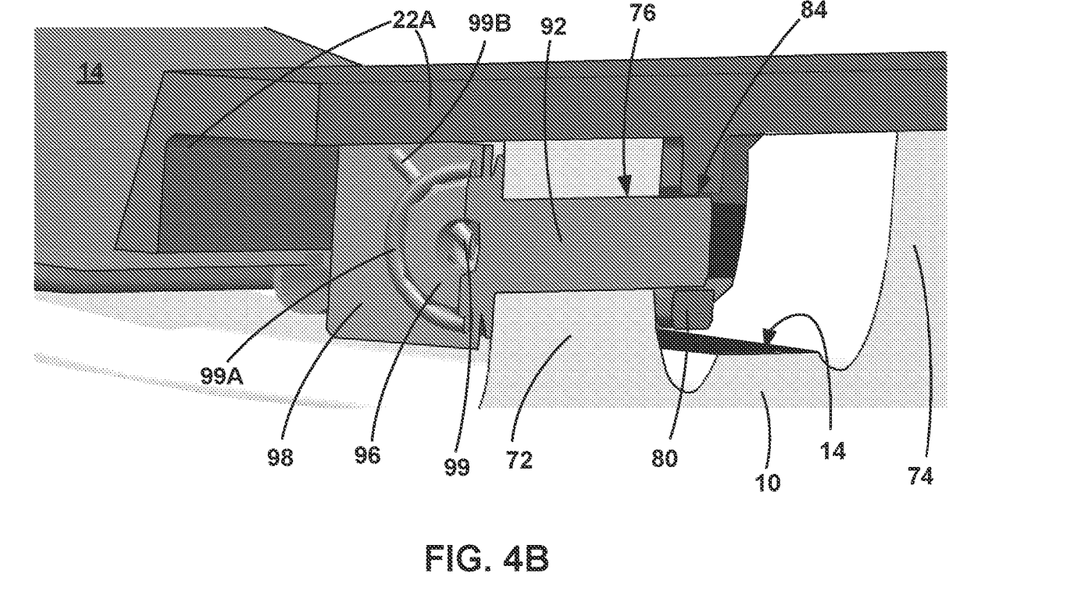
FIG. 4B is an enlarged cut-away view illustrating the example assembly including the rotor drive key attached to the interior surface of the wheel via the bolt and the bolt locking mechanism.
Figure 4C:
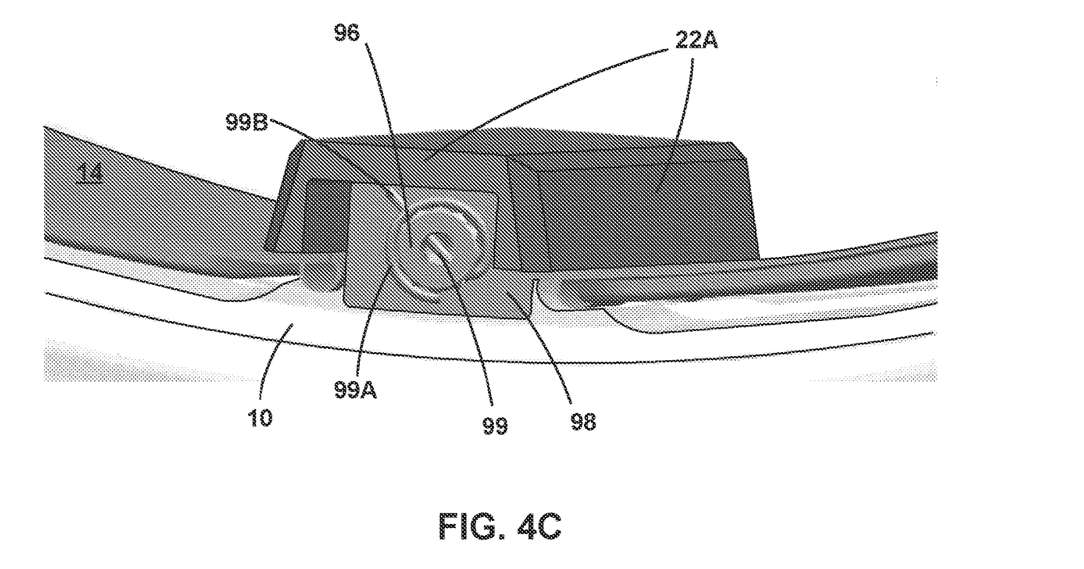
FIG. 4C is an enlarged perspective view illustrating the example assembly including the rotor drive key attached to the interior surface of the wheel via the bolt and the bolt locking mechanism.

FIG. 4A is an enlarged cross-sectional view illustrating an example assembly 90 including rotor drive key 22A attached to interior surface 14 of wheel 10 via a bolt 92 and a bolt locking mechanism. FIG. 4B is an enlarged cut-away view illustrating the example assembly 90 including rotor drive key 22A attached to interior surface 14 of wheel 10 via bolt 92 and the bolt locking mechanism. FIG. 4C is an enlarged perspective view illustrating the example assembly 90 including rotor drive key 22A attached to interior surface 14 of wheel 10 via bolt 92 and the bolt locking mechanism. In addition to bolt 92, the example of FIGS. 4A-4C also include second feature 82 configured to engage with second protrusion 74 in the substantially axial direction. Thus, in some examples, such as the example of FIGS. 4A-4C, rotor drive key 22A may be attached to wheel 10 via bolt 92, as well as via the mechanical engagement between second protrusion 74 and second feature 82 as described above.

In some examples, bolt 92 is inserted through first aperture 76 defined by first protrusion 72 and second aperture 84 defined by first feature 80. In this way, because both first and second apertures 76, 84 extend through first protrusion 72 and first feature 80, respectively, in the substantially axial direction, bolt 92 is inserted through first and second apertures 76, 84 in the substantially axial direction. For example, bolt 92 may be installed parallel to the length of rotor drive key 22A and an axle centerline. In turn, a length of bolt (e.g., from a head 96 of bolt 92 to an end 97 of bolt 92) may be oriented in the substantially axial direction of wheel 10, which may help keep bolt 92 relatively unaffected by the normal operation of wheel 10. For example, bolt 92 oriented in the substantially axial direction may be less likely to become unattached from rotor drive key 22A and/or wheel 10 due to vibration, sudden or jarring movements, heat cycling, or the like of wheel 10 or a vehicle in which wheel 10 is attached. In some examples, bolt 92 may be larger than some other bolts used to attach other rotor drive keys to a wheel. In some such examples, a relatively higher installation torque may be required to threadably attach bolt 92 to rotor drive key 22A, which may help prevent bolt 92 from becoming unattached from rotor drive key 22A.

In some cases, bolt 92 defines second set of threads 94 at or near end 97 of bolt 92. Second set of threads 94 defined by bolt 92 may include male or female threads. In examples in which second aperture 84 of first feature 80 defines first set of threads 86, second set of threads 94 of bolt 92 may be configured to form a threaded connection with first set of threads 86. Thus, in some such examples, one of first set of threads 86, 94 may define male threads, and the other of first set of threads 86 or 94 may define female threads. In some examples, bolt 92 configured to form a threaded connection with second aperture 84 may form the threaded connection without the use of a nut or another component. In turn, bolt 92 may be less likely to become unattached to rotor drive key 22A, which may help prevent rotor drive key 22A from becoming loose, disconnected, malfunctioning, or the like in comparison to some other rotor drive keys that use another fastener (e.g., other than a bolt forming a threaded connection with the rotor drive key itself). For example, a rotor drive key secured to a wheel via a nut and a bolt may have a shorted useful life in comparison to the rotor drive keys described herein. In addition, bolt 92 threadably connected to second aperture 84 may define a larger interface between the first and second set of threads 86, 94 which may increase the static friction between bolt 92 and rotor drive 22A, therefore helping keep rotor drive key 22A in the intended position on wheel 10. Moreover, the orientation of bolt 92 in the substantially axial direction in combination with bolt 92 forming a threaded connection directly with rotor drive key 22A may also help maintain rotor drive key 22A attached to wheel 10 as intended.

In some examples, forming a threaded connection between first set of threads 86 and second set of threads 94 may include tightening bolt 92. In some such examples, as bolt 92 is tightened, second protrusion 74 and second feature 82 may be configured to mechanically engage in the substantially axial direction. In other words, in some cases, second protrusion 74 and second feature 82 may not substantially mechanically engage before bolt 92 is inserted and/or tightened, and may be brought closer together in the substantially axial direction to mechanically engage upon tightening of bolt 92. In other examples, second protrusion 74 and second feature 82 may be substantially engage without the presence of and/or without tightening of bolt 92.

In some examples, assembly 90 may further include a locking mechanism configured to rotationally lock bolt 92 in place. In some such examples, the locking mechanism may include one or more of a locking plate, a cotter pin, a lock washer, a Nord-lock washer, a nylon insert, a retainer pin, a castle locking device, an adhesive, a safety wire, a safety cable, a retainer clip, or the like. In the example assembly 90 of FIGS. 4A-4C, the locking mechanism includes a locking plate 98 and a cotter pin 99. Locking plate 98 may be positioned over head 96 of bolt 92, and optionally deformed over head 96 of bolt 92, to form a relatively tight interference fit with head 96 of bolt 92. In some examples, the relatively tight interference fit between locking plate 98 and head 96 of bolt 92 may help prevent bolt 92 from loosening. For example, assembly 90 may help prevent bolt 92 from backing out of rotor drive key 22A by replacing a flush, countersunk screw (e.g., as in some other rotor drive key assemblies) with bolt 92 that is installed parallel to the length of rotor drive key 22A and the axle centerline, as well as by utilizing a suitable locking mechanism for bolt 92.

In some examples, head 96 of bolt 92 may define one or more apertures (not shown) configured to receive cotter pin 99. In this way, cotter pin 99 may inserted through the one or more apertures defined by head 96 of bolt 92. Cotter pin 99 may also be wrapped around head 96, extend out of the one or more apertures, or both. For instance, a first portion 99A of cotter pin 99 may be wrapped around head 96 of bolt 92, and a second portion 99B of cotter pin 99 may extend out of the one or more apertures. In some cases, first portion 99A wrapped around head 96 may help prevent bolt 92 from rotating and becoming loose, and may also help maintain cotter pin 99 engaged with head 96 of bolt 92 (e.g., inserted within the one or more apertures). In addition, or as an alternative, second portion 99B configured to extend from the one or more apertures may be configured to engage with rotor drive key 22A, such as, for example, in a case in which bolt 92 begins to loosen. For instance, if cotter pin 99 was to rotate due to bolt 92 beginning to loosen and rotating, second portion 99B of cotter pin 99 may contact rotor drive key 22A, which may impede further rotational movement of cotter pin 99, and therefore bolt 92. In other examples, assembly 90 may include one or more additional or alternative locking mechanisms, or assembly 90 may not include a locking mechanism configured to rotationally lock bolt 92 in place.

Figure 5:
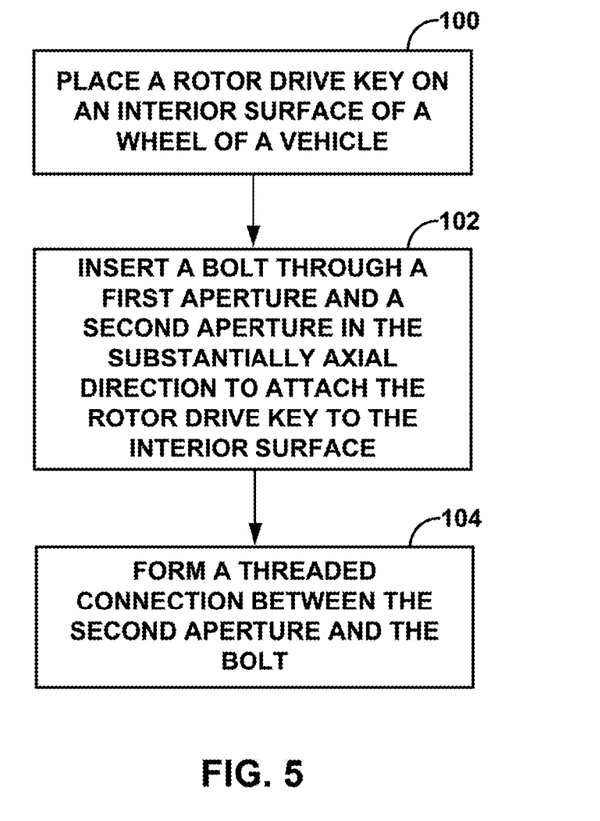
FIG. 5 is a flow diagram illustrating an example technique of attaching a rotor drive key to an interior surface of a wheel.

FIG. 5 is a flow diagram illustrating an example technique of attaching a rotor drive key to an interior surface of a wheel. The example technique of FIG. 5 will be described with respect to the example assembly 90 of FIGS. 4A-4C. In other examples, however, the technique of FIG. 5 may be used with different rotor drive keys and/or wheels, a different technique may be used to attach rotor drive key 22A to wheel 10.

The example technique of FIG. 5 optionally includes obtaining and/or manufacturing rotor drive key 22A. In some examples, rotor drive key 22A may be forged, casted, made from bar stock, additive manufactured (e.g., three-dimensionally (3D) printed), or the like. The material from which rotor drive key 22A is made may be any suitable material. For example, the material from which rotor drive key 22A is made may be any material of suitable strength for the intended use of rotor drive key 22A. In some examples, rotor drive key 22A includes a metal or a metal alloy. For example, rotor drive key 22A may include a nickel alloy or a steel alloy. As one example, rotor drive key 22A may include stainless steel. In some examples, rotor drive key 22A may be machined from the forged, cast, or bar stock material to obtain a rotor drive key 22A defining first feature 80 and second feature 82, where first feature 80 defines second aperture 84 extending through first feature 80 in the substantially axial direction. In other examples, rotor drive key 22A may be forged, cast, or otherwise formed (e.g., without having to be substantially machined) to define first feature 80 and second feature 82, where first feature 80 defines second aperture 84 extending through first feature 80 in the substantially axial direction. In some examples, rotor drive key 22A may be forged, cast, machined, additive manufactured (e.g., 3D printed), or the like to include first set of threads 86 defined by second aperture 84.

In some examples, wheel 10 may be finish machined from a near-net-shaped aluminum forging and contain structural support bosses (e.g., protrusions 72, 74) for assembly of rotor drive key 22A to wheel 10 using bolt 92 locked into place at one end of rotor drive key 22A and utilizing a feature (e.g., second feature 82 engaging with second protrusion 74) for impeding radial movement of the rotor drive key 22A at the other end of rotor drive key 22A. In other examples, wheel 10 may be manufactured in a different manner. In yet other examples, wheel 10 may be obtained rather than manufactured. In some examples, wheel 10 may be obtained and machined to form interior surface 14 including first and second protrusions 72, 74. Wheel 10 may be made of any suitable material. In some examples, rotor drive key 22A includes a metal or a metal alloy. For example, wheel 10 may include aluminum, a nickel alloy, a steel alloy (e.g., stainless steel), titanium, a carbon-composite material, or magnesium.

The example technique of FIG. 5 further includes placing rotor drive key 22A on interior surface 14 of wheel 10 (100). For example, rotor drive key 22A may be placed into the wheel tubewell over the structural support bosses (e.g., protrusions 72, 74) of wheel 10. As described herein, interior surface 14 of wheel 10 may define first protrusion 72 defining first aperture 76 extending therethrough in a substantially axial direction and second protrusion 74. In some examples, placing rotor drive key 22A on interior surface 14 of wheel 10 may include placing inner surface 78 of rotor drive key 22A on top surfaces 72A, 74A of first and second protrusions 72, 74, respectively, of wheel 10. When rotor drive key 22A is placed on interior surface 14 of wheel 10, first aperture 76 of first protrusion 72 may be configured to align with second aperture 84 of first feature 80. Additionally, or alternatively, second protrusion 74 may engage with second feature 82 when rotor drive key 22A is placed on interior surface 14 of wheel 10.

In some examples, bolt 92 may be inserted through first aperture 76 and second aperture 84 in the substantially axial direction to attach rotor drive key 22A to wheel 10 (102). As one example, rotor drive key 22A may be fixed into place by bolt 92 passing through a clearance hole (e.g., first aperture 76) in a boss (e.g., first protrusion 72) in the wheel tubewell, nearest the end of wheel 10 opposite the spoke. As another example, rotor drive key 22A may be fixed into place by bolt 92 passing through a clearance hole (e.g., first aperture 76) in a boss (e.g., first protrusion 72) in the wheel tubewell from the outboard side (e.g., spoke side) of wheel 10.

Bolt 92 may further be affixed to a threaded hole (e.g., second aperture 84) in rotor drive key 22A. For instance, in some cases, bolt 92 includes second set of threads 94. Thus, in some such examples, the technique of FIG. 5 may further include forming a threaded connection between bolt 92 and second aperture 84. For example, in examples in which second aperture 84 defines first set of threads 86, the technique of FIG. 5 may include forming a threaded connection between first set of threads 86 of second aperture 84 and second set of threads 94 of bolt 92 (104). Forming the threaded connection between second aperture 84 and bolt 92 may include threading first set of threads 86 of bolt 92 into second set of threads 94 of second aperture 84 and tightening bolt 92 while bolt 92 is inserted through first and second apertures 76, 84. For example, tightening bolt 92 while bolt 92 is inserted through first and second apertures 76, 84 may include tightening second set of threads 94 of bolt 92 into first set of threads 86 of second aperture 84.

In some cases, tightening bolt 92 via the threaded connection while bolt 92 is inserted though first aperture 76 and second aperture 84 may result in second protrusion 74 and second feature 82 contacting, which may enable second protrusion 74 and second feature 82 to mechanically engage in the substantially axial direction. In some such examples, second protrusion 74 and second feature 82 may mechanically engage in the substantially axial direction via an interference fit. For example, second set of threads 94 of bolt 92 may be tightened into first set of threads 86 of second aperture 84 such that second feature 82 engages second protrusion 74. In this way, as bolt 92 is tightened into place, the tightening may force engagement of the feature for impeding radial movement of rotor drive key 22A (e.g., second feature 82) with second protrusion 74 at the end of rotor drive key 22A opposite of bolt 92. In some examples, first protrusion 72 and first feature 80 may additionally, or alternatively, mechanically engage in the substantially axial direction when bolt 92 is tightened via the threaded connection while inserted through first aperture 76 and second aperture 84.

In some examples, assembly 90 may be easier, less time consuming, or less to manufacture and/or assemble than some assemblies including a rotor drive key different than rotor drive key 22A. For example, in examples in which rotor drive key 22A defines first set of threads 86 (e.g., in second aperture 84) configured to form a threaded connection with bolt 92, additional materials, such as a nut, may not be required to hold secure bolt 92 in place. In turn, processing time and/or an amount of parts for the assembly 90 may be reduced.

In some examples, the technique of FIG. 5 optionally includes rotationally locking bolt 92 in place via a locking mechanism. For example, once properly torqued, head 96 of bolt 92 may be locked into place. In some examples, rotationally locking bolt 92 in place may include rotationally locking bolt 92 in place via one or more of locking plate 98, cotter pin 99, a lock washer, a Nord-lock washer, a nylon insert, a retainer pin, a castle locking device, an adhesive, a safety wire, a safety cable, a retainer pin, or the like. In other examples, bolt 92 may not be rotationally locked in place.

Various examples have been described. These and other examples are within the scope of the following claims.

What is claimed is:

1. An assembly comprising:
   a wheel of a vehicle, wherein the wheel defines an interior surface and an exterior surface, wherein the interior surface defines a first protrusion and a second protrusion, wherein the first protrusion defines a first aperture extending through the first protrusion in a substantially axial direction, and wherein the first protrusion is axially spaced apart from the second protrusion;
   a rotor drive key on the interior surface of the wheel, wherein the rotor drive key defines a first feature and a second feature, wherein the first feature defines a second aperture extending through the first feature in the substantially axial direction, and wherein the second aperture is configured to align with the first aperture; and
   a fastener configured to be inserted through the first aperture and the second aperture in the substantially axial direction to attach the rotor drive key to the interior surface of the wheel, wherein the second aperture is configured to form a threaded connection with the fastener, wherein, when the rotor drive key is attached to the interior surface of the wheel with the fastener, the first feature is positioned axially between the first protrusion and the second protrusion, and wherein, when the fastener is tightened via the threaded connection while inserted through the first aperture and second aperture, the second feature engages the second protrusion.

2. The assembly of claim 1, wherein the second feature and the second protrusion mechanically engage in the substantially axial direction.

3. The assembly of claim 2, wherein the mechanical engagement between the second feature and the second protrusion comprises an interference fit.

4. The assembly of claim 1, wherein the second protrusion defines a concave surface and the second feature defines a convex surface corresponding to the concave surface, and wherein the concave surface and the convex surface mechanically engage in the substantially axial direction.

5. The assembly of claim 1, wherein the rotor drive key is attached to the wheel via the fastener and the engagement between the second feature and the second protrusion.

6. The assembly of claim 1, further comprising a locking mechanism configured to rotationally lock the fastener in place.

7. The assembly of claim 1, wherein the second aperture defines a first set of threads configured to form the threaded connection with a second set of threads of the fastener.

8. The assembly of claim 1, wherein the first feature and the first protrusion mechanically engage in the substantially axial direction.

9. An assembly comprising:
   a wheel of a vehicle, wherein the wheel defines an interior surface and an exterior surface, wherein the interior surface defines a first protrusion and a second protrusion, and wherein the first protrusion defines a first aperture extending through the first protrusion in a substantially axial direction;
   a rotor drive key on the interior surface of the wheel, wherein the rotor drive key defines a first feature and a second feature, and wherein the first feature defines a second aperture extending through the first feature in the substantially axial direction, wherein the second aperture is configured to align with the first aperture; and
   a fastener configured to be inserted through the first aperture and the second aperture in the substantially axial direction to attach the rotor drive key to the interior surface of the wheel, wherein the second aperture is configured to form a threaded connection with the fastener, and wherein, when the fastener is tightened via the threaded connection while inserted through the first aperture and second aperture, the second feature engages the second protrusion,
   wherein the second protrusion defines a concave surface and the second feature defines a convex surface corresponding to the concave surface, and wherein the concave surface and the convex surface mechanically engage in the substantially axial direction.

10. The assembly of claim 9, wherein the mechanical engagement between the second feature and the second protrusion comprises an interference fit.

11. The assembly of claim 9, wherein the rotor drive key is configured to attach to the wheel via the fastener and the engagement between the second feature and the second protrusion.

12. The assembly of claim 9, further comprising a locking mechanism configured to rotationally lock the fastener in place.

13. The assembly of claim 9, wherein the second aperture defines a first set of threads configured to form the threaded connection with a second set of threads of the fastener.

14. The assembly of claim 9, wherein the first feature and the first protrusion are configured to mechanically engage in the substantially axial direction when the rotor drive key is attached to the interior surface of the wheel.

15. An assembly comprising:
   a wheel of a vehicle, wherein the wheel defines an interior surface and an exterior surface, wherein the interior surface defines a first protrusion and a second protrusion, and wherein the first protrusion defines a first aperture extending through the first protrusion in a substantially axial direction;
   a rotor drive key on the interior surface of the wheel, wherein the rotor drive key defines a first feature and a second feature, wherein the first feature defines a second aperture extending through the first feature in the substantially axial direction, and wherein the second aperture is configured to align with the first aperture; and
   a fastener configured to be inserted through the first aperture and the second aperture in the substantially axial direction to attach the rotor drive key to the interior surface of the wheel, wherein the second aperture is configured to form a threaded connection with the fastener, and wherein, when the fastener is tightened via the threaded connection while inserted through the first aperture and second aperture, the second feature engages the second protrusion, and wherein the second aperture defines a first set of threads configured to form the threaded connection with a second set of threads of the fastener.

16. The assembly of claim 15, wherein the second feature and the second protrusion are configured to mechanically engage in the substantially axial direction when the rotor drive key is attached to the interior surface of the wheel.

17. The assembly of claim 16, wherein the mechanical engagement between the second feature and the second protrusion comprises an interference fit.

18. The assembly of claim 15, wherein the rotor drive key is configured to attach to the wheel via the fastener and the engagement between the second feature and the second protrusion.

19. The assembly of claim 15, further comprising a locking mechanism configured to rotationally lock the fastener in place.

20. The assembly of claim 15, wherein the first feature and the first protrusion are configured to mechanically engage in the substantially axial direction when the rotor drive key is attached to the interior surface of the wheel.

* * * * *